United States Patent
Are et al.

(10) Patent No.: US 8,784,061 B2
(45) Date of Patent: Jul. 22, 2014

(54) METHODS AND SYSTEMS FOR CONTROLLING THERMAL DIFFERENTIAL IN TURBINE SYSTEMS

(75) Inventors: Narendra Are, Greenville, SC (US); Roger Clayton Walker, Greenville, SC (US); Matthew Ryan Ferslew, Greenville, SC (US); Matthew Paul Forcier, Manchester, CT (US)

(73) Assignee: General Electric Company, Schenectady, NY (US)

( * ) Notice: Subject to any disclaimer, the term of this patent is extended or adjusted under 35 U.S.C. 154(b) by 688 days.

(21) Appl. No.: 13/017,758

(22) Filed: Jan. 31, 2011

(65) Prior Publication Data

US 2012/0195758 A1 Aug. 2, 2012

(51) Int. Cl.
F01D 5/08 (2006.01)
(52) U.S. Cl.
USPC ............. 416/198 A; 416/248; 415/175

(58) Field of Classification Search
USPC .......... 416/241 R, 241 A, 241 B, 198 A, 248; 415/200, 217.1, 175
See application file for complete search history.

(56) References Cited

U.S. PATENT DOCUMENTS

| | | | | |
|---|---|---|---|---|
| 4,277,222 A | * | 7/1981 | Barbeau | 415/177 |
| 4,279,575 A | * | 7/1981 | Avery | 416/244 A |
| 5,735,671 A | * | 4/1998 | Brauer et al. | 416/95 |
| 6,025,078 A | * | 2/2000 | Rickerby et al. | 428/469 |
| 6,497,968 B2 | | 12/2002 | Zhao et al. | |
| 7,556,851 B2 | | 7/2009 | Lampenscherf | |
| 2005/0255329 A1 | * | 11/2005 | Hazel | 428/472 |
| 2006/0110254 A1 | * | 5/2006 | Itzel et al. | 416/193 A |
| 2011/0280716 A1 | * | 11/2011 | Konitzer et al. | 415/177 |

FOREIGN PATENT DOCUMENTS

EP 2143884 A1 * 1/2010

* cited by examiner

*Primary Examiner* — Ninh H Nguyen
(74) *Attorney, Agent, or Firm* — Armstrong Teasdale LLP

(57) ABSTRACT

Method and system are provided for controlling a thermal differential within a turbine rotor for use with a turbine system. A thermal barrier coating is applied to a surface of the turbine rotor. The surface is proximate to a wheel rim of the turbine rotor.

20 Claims, 3 Drawing Sheets

US 8,784,061 B2

METHODS AND SYSTEMS FOR CONTROLLING THERMAL DIFFERENTIAL IN TURBINE SYSTEMS

BACKGROUND OF THE INVENTION

The subject matter disclosed herein relates generally to turbine systems and, more particularly, to methods and systems for controlling thermal differential in turbine systems.

At least some known turbine systems include a compressor that compresses air channeled downstream through the turbine system. During startup operations and/or shutdown of at least some known turbine systems, at least some portions of such compressors and/or rotors may be subjected to high temperatures, thermal gradients, high stresses, and/or vibrations. For example at least some known compressors include a plurality of stages that increasingly compress and, consequently, increase a temperature of air channeled therethrough. Such differences in airflow temperature may result in thermal gradients developing within the compressor. Moreover, at least some surfaces are exposed to the flow path more than other portions of the compressor. As a result, other thermal gradients may develop within compressor. Such thermal gradients and/or thermal stresses may cause uneven expansion, bending, and/or other stresses within the compressor that, at times, could lead to undesired slipping and/or rubbing of compressor components.

To improve an efficiency and/or a power output of at least some turbine systems, a compressor discharge temperature, a firing temperature, and/or a core flow rate may be increased. However, increasing any of the aforementioned operational characteristics could increase the likelihood of thermal gradients and/or thermal stresses being developed within the compressor and/or the rotor.

BRIEF DESCRIPTION OF THE INVENTION

In one aspect, a method is provided for controlling a thermal differential within a turbine rotor for use with a turbine system. The method includes selecting a surface of the turbine rotor proximate to a wheel rim of the turbine rotor and applying a thermal barrier coating to the surface of the turbine rotor.

In another aspect, a turbine rotor is provided for use with a turbine system. The turbine rotor includes a surface proximate to a wheel rim of the turbine rotor and a thermal barrier coating applied to the surface.

In yet another aspect, a turbine system is provided. The turbine system includes a turbine rotor including a surface proximate to a wheel rim of the turbine rotor. A thermal barrier coating is applied to the surface of the turbine rotor.

DETAILED DESCRIPTION OF THE INVENTION

The subject matter described herein relates generally to turbine systems and, more particularly, to methods and systems for controlling a thermal differential within a turbine rotor. In one embodiment, a thermal barrier coating is applied to at least one surface of the turbine rotor, wherein the surface is selected based on stress levels, transient thermal gradients, and/or surrounding heat transfer environment. Applying the thermal barrier coating to such surfaces facilitates controlling transient thermal stresses within the turbine rotor and, thus, facilitates increasing a useful operating life of the turbine system. The turbine rotor surface may be disposed within a compressor and/or a turbine section of the turbine system.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
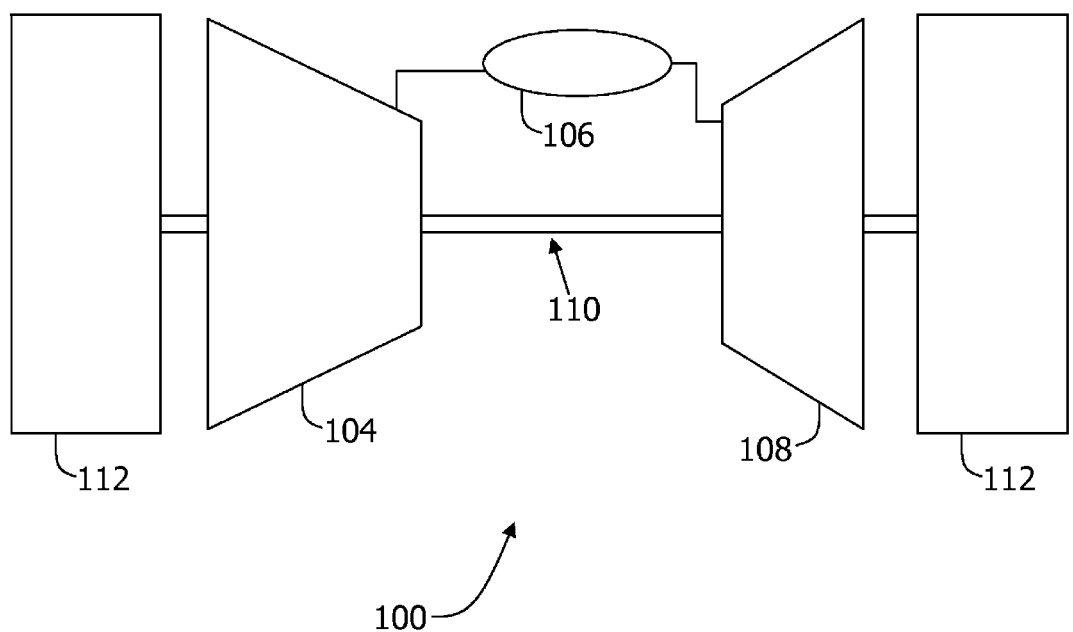
FIG. 1 is a schematic illustration of an exemplary turbine system.

FIG. 1 is a schematic illustration of an exemplary turbine system 100. In the exemplary embodiment, turbine system 100 includes, coupled in serial flow arrangement, a compressor 104, a combustor assembly 106, and a turbine 108 that is rotatably coupled to compressor 104 via a rotor shaft 110.

During operation, in the exemplary embodiment, ambient air is channeled through an air inlet towards compressor 104. The ambient air is then compressed by compressor 104 prior to being directed towards combustor assembly 106. In the exemplary embodiment, compressed air within combustor assembly 106 is mixed with fuel, and the resulting fuel-air mixture is then ignited within combustor assembly 106 to generate combustion gases that are directed towards turbine 108. In the exemplary embodiment, turbine 108 extracts rotational energy from the combustion gases and rotates rotor shaft 110 to drive compressor 104. Moreover, in the exemplary embodiment, turbine system 100 drives a load 112, such as a generator, coupled to rotor shaft 110. In the exemplary embodiment, load 112 is positioned downstream of turbine system 100. Alternatively, load 112 may be positioned upstream of turbine system 100.

Figure 2:
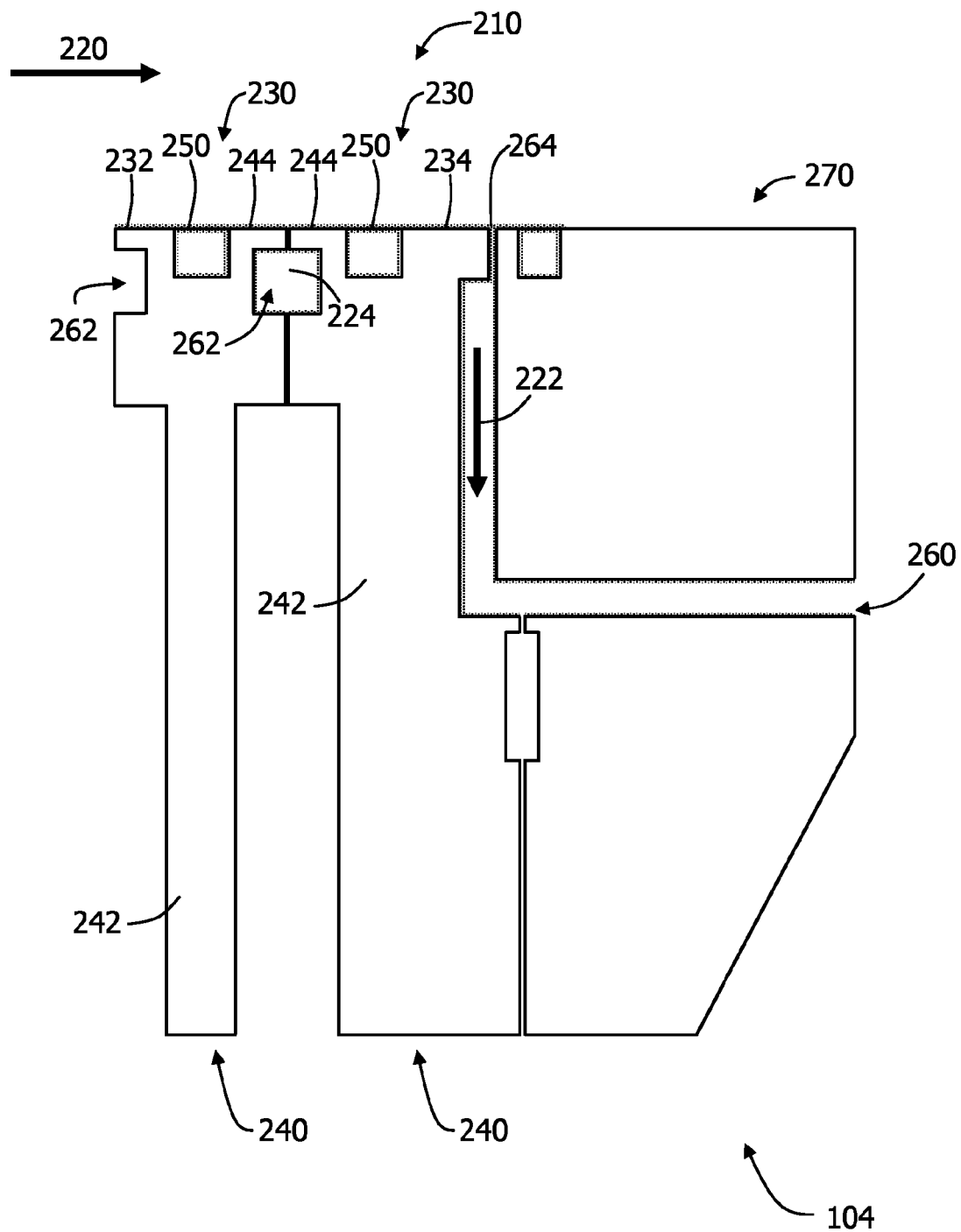
FIG. 2 is a cross-sectional illustration of an exemplary turbine rotor that may be used with the turbine system shown in FIG. 1.

FIG. 2 is a cross-sectional illustration of a portion of a turbine rotor or, more specifically, compressor 104. In the exemplary embodiment, compressor 104 includes a plurality of stages 230 that include at least a first stage 232 and a second stage 234 that is positioned downstream from first stage 232. In the exemplary embodiment, each stage 230 includes at least one rotor disc 240 that is formed with a disc web 242 bounded circumferentially by a wheel rim 244.

In the exemplary embodiment, at least some portions of airflow 220 channeled through compressor 104 is diverted through at least one slot 260 defined within compressor 104. For example, in the exemplary embodiment, compressor 104 includes a circumferential slot 262 that is oriented to channel a portion 224 of airflow 220 in a circumferential direction, and a radial slot 264 that is oriented to channel a portion 222 of airflow 220 in a radial direction. More specifically, in the exemplary embodiment, airflow portion 224 is directed through circumferential slot 262, and airflow portion 222 is directed through radial slot 264. In the exemplary embodiment, slots 262 and/or 264 facilitate cooling portions of compressor 104 that are proximate to wheel rim 244 and/or combustor assembly 106.

In the exemplary embodiment, compressor 104 includes a rim aft face 270 that is downstream from stages 230 and discs 240. More specifically, in the exemplary embodiment, rim aft face 270 is between wheels 240 and combustor assembly 106. As such, in the exemplary embodiment, rim aft face 270 provides a buffer area between compressor 104 and combustor assembly 106, to facilitate shielding relatively hot air-fuel mixtures ignited in combustor assembly 106.

In the exemplary embodiment, at least some sections and/or portions of compressor 104 are subjected and/or exposed to higher temperatures than other sections and/or portions. Moreover, within such sections and/or portions, at least some surfaces of compressor 104 are exposed to airflow 220 and/or higher temperatures more than other portions of compressor 104. For example, in the exemplary embodiment, disc rim 244 has more exposure to airflow 220 than a disc bore and/or disc web 242. Moreover, in the exemplary embodiment, compressor 104 includes a dovetail slot and loading locations 250 sized and/or oriented to receive an airfoil (not shown) therein. In the exemplary embodiment, slot and loading locations 250 is exposed to higher temperatures than other portions of compressor 104.

Accordingly, in the exemplary embodiment, a thermal barrier coating (TBC) 210 is applied to at least some high heat transfer and/or high temperature regions of compressor 104 including, for example, disc rim 244 to facilitate controlling a thermal differential within compressor 104. As such, TBC 210 facilitates shielding at least some of these surfaces within compressor 104 from relatively high temperatures and/or heat transfer convention coefficient. In the exemplary embodiment, TBC 210 is fabricated from a material having a thermal conductivity that is suitable to enable turbine system 100 to function as described herein. For example, TBC 210 may be fabricated from, without limitation, ceramics and/or sprayed oxides.

TBC 210 may be applied to any suitable rotor and/or static structure within turbine system 100. Additional surfaces for application of TBC 210 may be selected based on various factors including, but not limited to, stress levels, transient thermal gradients, and/or a surrounding heat transfer environment. For example, in the exemplary embodiment, TBC 210 shields the outer surfaces of each stage 230 of compressor 104 including disc rim 244, slot and loading locations 250, slots 262 and 264, and/or rim aft face 270 from exposure to high temperatures of airflow 220.

In the exemplary embodiment, TBC 210 is applied with a thickness that is suitable to provide a thermal barrier without substantially affecting airflow 220 within compressor 104. For example, in the exemplary embodiment, TBC 210 has a thickness of less than approximately 0.04 inches. Particularly, TBC 210 has a thickness of less than approximately 0.02 inches. More particularly, TBC 210 has a thickness of less than approximately 0.005 inches. Alternatively, TBC 210 may have a thickness of greater than or equal to approximately 0.04 inches.

During operation, as airflow 220 is channeled through compressor 104, a portion of airflow 220 is channeled through compressor 104 directly to combustor assembly 106. As airflow 220 flows downstream and is compressed by compressor 104, the temperature of airflow 220 generally increases. For example, in the exemplary embodiment, airflow 220 upstream from first stage 232 may be approximately 700-800° F. while airflow 220 downstream from second stage 234 may be approximately 750-850° F. Moreover, in the exemplary embodiment, a portion of airflow 220 is directed through slots 262 and 264. More specifically, in the exemplary embodiment, airflow portion 224 flows circumferentially within compressor 104, and airflow portion 222 flows radially outward within compressor 104. In the exemplary embodiment, a compressor discharge is directed through rim aft face 270 towards combustor assembly 106. In the exemplary embodiment, the compressor discharge temperature may be greater than approximately 800° F.

Figure 3:
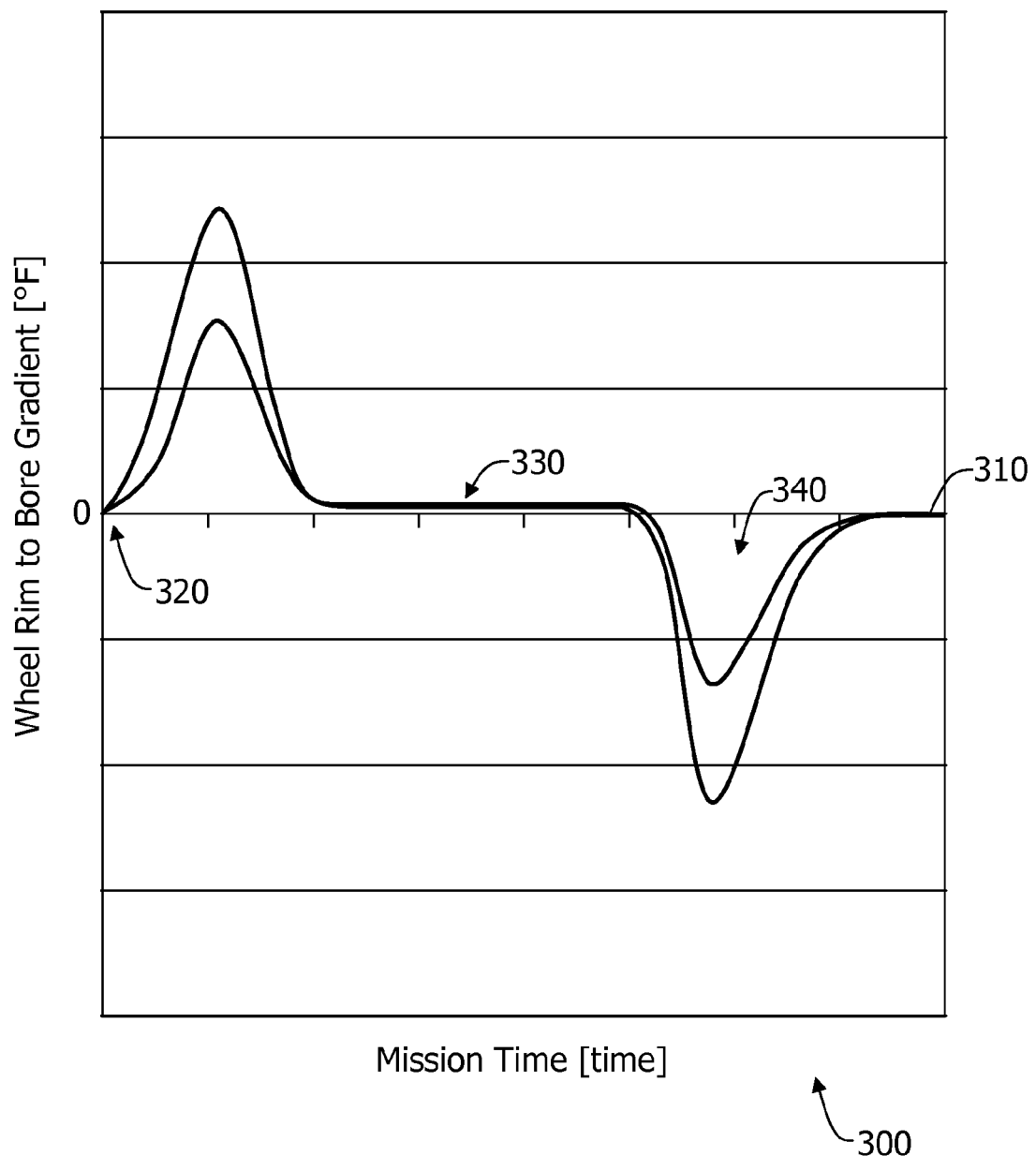
FIG. 3 is a graph illustrating an exemplary temperature difference that may occur during an exemplary operating cycle of the turbine rotor shown in FIG. 2.

FIG. 3 is a graph 300 illustrating an exemplary temperature difference, or a delta temperature 310, of a surface protected by TBC 210 during operation of turbine rotor or, more specifically, compressor 104. More specifically, the X-axis is representative of a mission time measured in seconds, and the Y-axis is representative of a difference in temperature between wheel rim 244 and bore 242. As shown in FIG. 3, the mission time includes three stages to the operating cycle of turbine system 100: a startup 320, a main operating stage 330, and a shutdown 340.

In the exemplary embodiment, during startup 320 of turbine system 100, compressor 104 is subjected to a quick increase in temperature. Accordingly, surfaces within compressor 104 may be subjected to a relatively quick increase in delta temperature 310, as is indicated by the spike in delta temperature 310. In the exemplary embodiment, TBC 210 facilitates reducing delta temperature 310 during startup 320 as compared to a compressor 104 without TBC 210. As such, TBC 210 facilitates reducing a transient response rate during startup 320 of turbine system 100.

Until operation of compressor 104 stabilizes for main operating stage 330, in the exemplary embodiment, delta temperature 310 decreases relatively steadily. In the exemplary embodiment, the operating temperature of compressor 104 is relatively steady and, thus, during main operating stage 330, delta temperature 310 is relatively constant at approximately 0° F.

In the exemplary embodiment, during shutdown 340 of turbine system 100, compressor 104 is subjected to a quick decrease in temperature. Accordingly, surfaces within compressor 104 may be subjected to a relatively quick increase in delta temperature 310 in a negative direction, as is indicated by the dip in delta temperature 310. In the exemplary embodiment, TBC 210 facilitates decreasing delta temperature 310 during shutdown 340 as compared to a compressor 104 without TBC 210. In the exemplary embodiment, delta temperature 310 increases overtime until compressor 104 is cooled down. As such, TBC 210 facilitates reducing a transient response rate during shutdown 340 of turbine system 100.

The exemplary methods and systems described herein facilitate controlling a rotor thermal differential of a turbine rotor and/or turbine system. By reducing a change in temperature difference of the turbine rotor surface, the exemplary methods and systems facilitate decreasing stresses and, therefore, increasing an operating life of the turbine rotor and/or a turbine system. Additionally, the methods and systems described herein may enable the compressor to have high compressor discharge temperatures, firing temperatures, and/or core flow rates, thereby increasing an efficiency of turbine system as well as faster operational cycles. Moreover, controlling such temperature differences of the turbine rotor facilitates reducing thermal gradients, which may result in reducing undesired slipping and/or rubbing of rotor and/or static components.

Exemplary embodiments of methods and systems are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a thermal differential within a compressor of a gas turbine system, said method comprising:
   selecting one or more surfaces of a plurality of rotors of the compressor, wherein at least one of the surfaces selected is proximate to a wheel rim of a rotor of the plurality of rotors and at least one of within a loading location defined within the rotor and radially inward from the wheel rim; and
   applying a thermal barrier coating to the one or more surfaces of the plurality of rotors to facilitate reducing a transient heat transfer rate during startup.

2. A method in accordance with claim 1, wherein applying a thermal barrier coating further comprises applying the thermal barrier coating with a thickness of less than approximately 0.04 inches.

3. A method in accordance with claim 1, wherein selecting a surface further comprises selecting a disc, and wherein applying a thermal barrier coating further comprises applying the thermal barrier coating to at least the disc.

4. A method in accordance with claim 1, wherein selecting a surface further comprises selecting a slot defined within a compressor, and wherein applying a thermal barrier coating further comprises applying the thermal barrier coating within at least the slot.

5. A method in accordance with claim 1, wherein selecting a surface further comprises selecting a plurality of discs and an aft section positioned downstream of the plurality of discs, and wherein applying a thermal barrier coating further comprises applying the thermal barrier coating to at least the aft section.

6. A method in accordance with claim 1, wherein selecting a surface further comprises selecting the surface within a portion of a compressor.

7. A method in accordance with claim 1, wherein the surface selected is not directly exposed to a primary hot gas path defined within the turbine system.

8. A plurality of rotors for use within a compressor of a gas turbine system, or each rotor of said plurality of rotors comprising:
   one or more surfaces proximate to a wheel rim of said compressor rotor, wherein said surface is at least one of within a loading location defined within the compressor rotor and radially inward from the wheel rim; and
   a thermal barrier coating applied to said one or more surfaces to facilitate reducing a transient heat transfer rate during startup.

9. A plurality of rotors in accordance with claim 8, wherein said thermal barrier coating has a thickness of less than approximately 0.04 inches.

10. A plurality of rotors in accordance with claim 8 further comprising a disc, wherein said surface is positioned on said disc.

11. A plurality of rotors in accordance with claim 8 further comprising a circumferential slot defined within said turbine rotor, wherein said surface is positioned within said circumferential slot.

12. A plurality of rotors in accordance with claim 8 further comprising a plurality of discs and an aft section positioned downstream of said plurality of discs, wherein said surface is positioned on said aft section.

13. A plurality of rotors in accordance with claim 8 further comprising a radial slot defined within said turbine rotor, wherein said surface is positioned within said radial slot.

14. A turbine rotor in accordance with claim 8, wherein said surface is not directly exposed to a primary hot gas path defined within the turbine system.

15. A gas turbine system comprising a compressor, said compressor comprising:
   a plurality of rotors, each rotor comprising one or more surfaces, wherein at least one of the surfaces is proximate to a wheel rim of said rotor and is at least one of within a loading location defined within the rotor and radially inward from the wheel rim; and
   a thermal barrier coating applied to the one or more surfaces of the plurality of rotors to facilitate reducing a transient heat transfer rate during startup.

16. A turbine system in accordance with claim 15, wherein said thermal barrier coating has a thickness of less than approximately 0.04 inches.

17. A turbine system in accordance with claim 15, wherein said turbine rotor further comprises a disc, wherein said surface is positioned on said disc.

18. A turbine system in accordance with claim 15, wherein said turbine rotor further comprises a slot defined within said turbine rotor, wherein said surface is positioned within said slot.

19. A turbine system in accordance with claim 15, wherein said turbine rotor further comprises an aft section positioned downstream of a plurality of discs of said turbine rotor, wherein said surface is positioned on said aft section.

20. A turbine system in accordance with claim 15, wherein the surface is not directly exposed to a primary hot gas path defined within the turbine system.

* * * * *

UNITED STATES PATENT AND TRADEMARK OFFICE
CERTIFICATE OF CORRECTION

| | | |
|---|---|---|
| PATENT NO. | : 8,784,061 B2 | Page 1 of 1 |
| APPLICATION NO. | : 13/017758 | |
| DATED | : July 22, 2014 | |
| INVENTOR(S) | : Are et al. | |

It is certified that error appears in the above-identified patent and that said Letters Patent is hereby corrected as shown below:

In the Claims

In Column 5, Line 48, in Claim 8, delete "or each" and insert -- each --, therefor.

Signed and Sealed this
Second Day of June, 2015

Michelle K. Lee
*Director of the United States Patent and Trademark Office*